United States Patent [19]

Voirin

[11] Patent Number: 4,479,928
[45] Date of Patent: Oct. 30, 1984

[54] CATALYTIC PROCESS FOR THE PRODUCTION OF SULPHUR FROM A GAS CONTAINING $H_2S$

[75] Inventor: Robert Voirin, Orthez, France

[73] Assignee: Societe Nationale Elf Aquitaine (Production), Paris, France

[21] Appl. No.: 409,604

[22] Filed: Aug. 19, 1982

[30] Foreign Application Priority Data

Aug. 19, 1981 [FR] France ............................ 81 15900

[51] Int. Cl.³ .............................................. C01B 17/02
[52] U.S. Cl. ........................... 423/574 R; 423/567 R; 423/573 R; 423/573 G
[58] Field of Search ................... 423/567 R, 570, 571, 423/573 R, 573 G, 574 R, 574 L

[56] References Cited

U.S. PATENT DOCUMENTS

| | | | |
|---|---|---|---|
| 2,697,064 | 12/1954 | Brown | 423/576 |
| 3,939,250 | 2/1976 | Michel | 423/571 |
| 4,141,962 | 2/1979 | Dupsy et al. | 423/576 |
| 4,192,857 | 3/1980 | Tellier et al. | 423/576 |
| 4,399,112 | 8/1983 | Voirin | 423/244 |

FOREIGN PATENT DOCUMENTS 2087373  5/1982  United Kingdom ............... 423/574

*Primary Examiner*—Gregory A. Heller
*Attorney, Agent, or Firm*—Burgess, Ryan & Wayne

[57] ABSTRACT

Catalytic process for the production of sulphur from an acid gas containing $H_2S$, in which a part of $H_2S$ is catalytically oxidized in order to form an effluent containing $H_2S$ and $SO_2$ in a molar ratio of 2:1 and a given quantity of sulphur. The effluent is then contacted with a CLAUS catalyst to form a further quantity of sulphur.

Said process involves:
an oxidation reactor with a fixed bed
an indirect gas/gas heat exchanger
deoxygenation reactor having a fixed bed
a catalyst conversion battery
a thermal incinerator.

28 Claims, No Drawings

CATALYTIC PROCESS FOR THE PRODUCTION OF SULPHUR FROM A GAS CONTAINING $H_2S$

BACKGROUND OF THE INVENTION

The invention relates to a catalytic process for the production of sulphur from a gas, called acid gas, containing $H_2S$ and more especially from an acid gas containing at the most 20% by volume $H_2S$.

In known plants for the production of sulphur from a gas containing hydrogen sulphide, also known as "acid gas", this gas is caused to flow in a thermal reaction stage in which one third of the hydrogen sulphide is transformed into $SO_2$ in the presence of oxygen or air at a temperature at least equal to 900° C. The gaseous reaction mixture contains a certain quantity of sulphur as well as $H_2S$ and $SO_2$ in a $H_2S/SO_2$ molar ratio of 2/1. This gaseous mixture is subjected to indirect cooling allowing the recovery of calories contained therein, while producing steam, and the cooled mixture is caused to flow to a condensation stage in which the sulphur contained in the gaseous mixture is separated by condensation. In order to improve the sulphur production, which at this stage is still very incomplete, the gaseous mixture issuing from the condensation stage is reheated and then fed into one or several catalytic conversion stages comprising a suitable catalyst, called a CLAUS catalyst, at the contact of which $SO_2$ reacts with $H_2S$ in order to form a fresh quantity of sulphur. The residual gases issuing from the final catalytic conversion stage are caused to flow to an incineration stage, the effluents of which are thereafter discarded in the atmosphere.

The use of a thermal reaction stage to oxidize into $SO_2$ the required quantity of $H_2S$, is only possible for $H_2S$ concentrations of acid gas higher than about 15 to 20% by volume. For values lower than that limit, it is not possible to maintain a sufficient flame temperature, i.e. in the range of 900° C. or more, to obtain a stable combustion without necessitating important modifications.

Furthermore, this high-temperature thermal reaction leads to a transformation of part of the sulphur produced into COS and $CS_2$ when the acid gas contains $CO_2$ and/or hydrocarbons. The formation of these organic sulphur compounds is bothersome in so far that they can only be transformed with difficulty into sulphur in the catalytic conversion stages, and this contributes consequently to the decrease of the overall sulphur conversion yield of a sulphur plant.

In order to overcome these drawbacks, resulting from the use of a thermal reaction stage for producing effluent containing $H_2S$ and $SO_2$ in a $H_2S/SO_2$ ratio of 2/1, German Patent Application No. 3 015 800 proposes replacing the thermal reaction stage of a sulphur plant with a catalytic oxidation stage using an oxidation catalyst based on a vanadium oxide or sulphide supported on a non-alkaline porous refractory matrix and operating at temperature lower than 454° C., the said temperatures being controlled by recycling part of the gaseous effluent from the catalytic oxidation stage, after cooling of said effluent and condensation of the sulphur contained therein.

In such a process, the necessity of recycling part of the effluent of the catalytic oxidation stage for controlling the temperature of said stage causes a certain number of technological restrictions and leads especially to the use of quantities of catalyst in the oxidation stage, which are more important as the $H_2S$ concentration in the acid gas is high.

The invention relates to a catalytic process of sulphur production from a gas containing $H_2S$, of a type similar to the process of the hereinabove mentioned German Patent Application, but in which a particular oxidation catalyst is used which allows operating at high temperatures, especially reaching 700° C., thus preventing the recycling operation of a part of the oxidation stage effluent, after its cooling, destined to ensure the temperature control in the oxidation stage, and thus eliminating the restrictions of such a recycling.

The process according to the invention for the production of sulphur from a gas, known as "acid gas", containing $H_2S$, is of the type in which the acid gas, at high temperature and in the presence of a $H_2S$-oxidation catalyst is contacted with a determined quantity of a gas containing free oxygen in order to form a gaseous effluent containing $H_2S$ and $SO_2$ in a $H_2S/SO_2$ molar ratio substantially equal to 2/1 as well as a given proportion of sulphur; then said gaseous effluent, after cooling and possible separation of the sulphur contained therein, is contacted with a CLAUS catalyst to form a fresh quantity of sulphur, said $H_2S$ oxidation catalyst comprising a non-alkaline porous refractory matrix formed of one or several oxides having a surface area of at least 5 $m^2/g$, to which are associated one or several metal compounds selected from the group constituted by Fe, Cu, Zn, Cd, Cr, Mo, W, Co, Ni and Bi and possibly one or several precious metal compounds.

The porous matrix of the oxidation catalyst comprises 50 to 100% by weight of at least one product selected from among silica, titanium oxides expressed as $TiO_2$, zirconium oxides expressed as $ZrO_2$ and zeolites, especially zeolites of the faujasite type, mordenite and ferrierite, and by 50 to 0% by weight of alumina.

By the expression "titanium oxide or zirconium oxide" is meant an oxide compound of titanium or zirconium, which according to the methods of preparation used to obtain it, can consist of $TiO_2$ or $ZrO_2$ or oxyhydrate type compounds.

The porous matrix of the oxidation catalyst has a surface area, determined according to the BET method, of at least 5 $m^2/g$, especially of 20 to 800 $m^2/g$ and preferentially of 50 to 600 $m^2/g$.

The metal compounds that are associated to the porous matrix defined herein-above are especially oxides or salts of mineral or organic acids such as sulfates, nitrates, phosphates, acetates.

The overall quantity of one or several metal compounds that are associated to the matrix, can represent, expressed by weight of metal, 0.5 to 15% by weighty and preferably between 4 and 12% by weight of calcined catalyst.

When there are simultaneously associated to the matrix one or several non precious metal compounds and one or several precious metal compounds, these latter being especially Pd, Pt, Ir and Rh, the ratio total number of atoms of the non precious metal(s)/total number of precious metal atoms is between 20 and 1000 and preferably between 50 and 400.

The preferred oxidation catalysts according to the invention consist in a porous matrix such as defined above, more particularly comprising a silica, a titanium oxide of the $TiO_2$ or titanium oxyhydrate type or zirconium oxide of the $ZrO_2$ or oxyhydrate type, the surface area of which is of at least 5 $m^2/g$, especially of 20 to 800 m²/g and preferably of 50 to 600 m²/g and said matrix being further associated to an iron compound, more particularly iron sulfate, or an iron compound plus a precious metal compound, especially a palladium compound, used in proportions such that the total weight of iron or of iron plus precious metal compound constitutes 0.5 to 15% and preferably 4to 12% by weight of the weight of the calcined catalyst and that the ratio of the number of iron atoms to the number of precious metal atoms, when this latter is present, is between 20 and 1000 and more precisely between 50 and 400.

A suitable oxidation catalyst which enables one to operate at temperatures up to 700° C. without any significant activity loss, consists in a silica having a surface area of about 50 to about 600 m²/g to which is associated an iron compound, more precisely an iron sulfate, or an iron compound with a palladium compound such that the proportions of iron or iron plus palladium forms 4 to 12% by weight of the calcined catalyst and that the ratio of the number of iron atoms to the number of palladium atoms, if present, is between 20 and 1000 and more precisely between 50 and 400.

The preparation of both the oxidation catalyst and the said matrix of the catalyst can be achieved by using any of the known methods for this purpose. For example, a silica, titanium oxide, or zirconium oxide matrix can be obtained by precipitating a hydrogel of silica, titanium oxyhydrate or zirconium oxyhydrate from respectively sodium silicate, a titanium or a zirconium salt, then by formation of the hydrogel in pellets or in beads and thereafter by drying and calcining of the thus formed pellets or beads. A $SiO_2$, $TiO_2$ or $ZrO_2$ matrix can also be formed by hydrolysis respectively of $SiCL_4$, $TiCL_4$ or $ZrCL_4$, pelletizing the oxide formed, then drying and calcining the pellets. A mixed matrix, containing, for example, $SiO_2$ and/or a titanium or a zirconium oxide jointly with alumina can be produced by mixing the selected oxides prepared separately or by a coprecipitation of the oxides from sodium silicate and/or titanium or zirconium salts and aluminium salts. The catalyst can be obtained, for example, by impregnation of the selected matrix with the desired metal compound(s), then drying of the impregnated matrix and calcination of the dried product at a temperature especially, between 300° and 700° C. The association of the above-mentioned metal compounds with the matrix can also be achieved by coprecipitation techniques or by mixing the constituents of the catalyst in the form of oxides.

The acid gas, i.e., the gas containing $H_2S$, that is treated in order to form sulphur by the process according to the invention, can be of various origins. Especially, such an acid gas can be a natural gas or also a gas issuing from the gasification of coal or heavy oils. The process according to the invention applies particularly to the treatment of acid gases containing 0.5 to 20% $H_2S$ by volume. Acid gases containing a higher $H_2S$ content can also be treateed by this process although in this case there is preferably used, the standard process of sulphur production, comprising a thermal reaction. The acid gas can also contain inorganic sulphur compounds such as COS, $CS_2$, having an overall concentration that can be present in a quantity up to 1% by volume.

The gas containing the free oxygen used for the oxidation of $H_2S$ of the acid gas is generally air, although it is possible to use pure oxygen, oxygen-enriched air, or mixtures, in variable proportions, of an inert gas other than nitrogen and oxygen. The acid gas and the gas containing free oxygen can be brought separately into contact with the oxidation catalyst.

However, with the aim of obtaining a very homogenous gaseous reaction medium, it is preferable to premix the acid gas containing free oxygen and to cause the thus produced mixture to flow in contact with the oxidation catalyst. The gas containing free oxygen is used in a quantity controlled so that there is a quantity of oxygen corresponding to that necessary to partially oxidize $H_2S$ into $SO_2$ so as to form an effluent containing $H_2S$ and $SO_2$ in a $H_2S/SO_2$ molar ratio equal to 2/1 as well as a given quantity of sulphur and a practically negligible residual oxygen content.

The control of the quantity of gas containing free oxygen is achieved in a manner known per se, through determination of the value of the $H_2S/SO_2$ molar ratio or the oxygen content in the oxidation effluent and causing to vary the flow of the gas containing free oxygen used for oxidation in response to a control value obtained from the compilation of the results of these determinations, so as to maintain the said $H_2S/SO_2$ molar ratio at a value of 2/1 or the said oxygen content below a fixed value.

Contact time of the gaseous reaction medium with the oxidation catalyst can range from 0.5 to 10 seconds, these values being given in standard pressure and temperature conditions.

As indicated herein-above, the partial oxidation of $H_2S$ of the acid gas by oxygen of the gas containing free oxygen is achieved at a high temperature, i.e., according to the invention, at a temperature between 200° and 900° C. and preferably between 300° and 700° C. In order to establish a suitable oxidation temperature comprised in this range, the gaseous mixture of the acid gas and the gas containing free oxygen or each of the said gases, when they are brought separately into contact with the oxidation catalyst, is subjected to a preheating at a temperature between 180° C. and 250° C. and higher in this range when the $H_2S$ content of the acid gas is low.

The effluent of the oxidation of the acid gas contains sulphur vapor as as well as $H_2S$ and $SO_2$ in a $H_2S/SO_2$ molar ratio equal to 2/1. This effluent is subjected to cooling, and the cooled effluent, possibly freed of sulphur that it contains, is contacted with a CLAUS catalyst in order to achieve the $H_2S$ and $SO_2$ reaction and to form a further quantity of sulphur.

When the $H_2S$ content of the effluent of the oxidation is lower than 2% by volume, the contacting of the said effluent with the CLAUS catalyst is effected at a temperature lower than the dew point of the sulphur contained in the said effluent, this temperature being advantageously between 80° C. and 160° C., and the sulphur formed by the reaction of $H_2S$ and $SO_2$ is deposited on the catalyst.

Periodically, the sulphur loaded CLAUS catalyst is regenerated by sweeping of the said catalyst with a gas devoid of free oxygen and at a temperature between 200° C. and 400° C. In such an application, this CLAUS reaction is achieved in a series of catalytic converters, which operate in such a way that at least one of the said converters is in a regeneration phase whereas the others are in a CLAUS reaction phase, and the effluent of the oxidation zone is caused to flow firstly in the converter(s) of the regeneration phase, the said effluent acting as a regeneration gas and then, after condensation of the sulpher, in the converter(s) of the CLAUS reaction phase.

When the H₂S content of the oxidation effluent is equal to or above 2% by volume, the contacting of the said effluent, possibly free of sulphur that it contains, with the CLAUS catalyst is effected, at temperatures higher than the dew point of the sulpher contained in the effluent, these temperatures being generally between 200° C. and 450° C. in a single catalytic converter or in several of such converters mounted in series as in the case of a standard sulphur plant. If it is necessary to perfect the recovery of the sulphur contained in the form of H₂S and SO₂ in the effluent, the contacting of the effluent with the CLAUS catalyst above the dew point of the sulphur contained in the effluent can be followed by a contacting at a temperature lower than the dew point of sulphur as indicated herein-above.

The CLAUS catalyst, with which the oxidation effluent is contacted in one or several catalytic converters as indicated herein-above, can be any one of the catalysts normally used to promote the formation of the sulphur by reaction between H₂S and So₂. The most suitable products are aluminas, bauxite, titanium or zirconium oxides, silicas, natural or synthetic zeolites, and mixtures of such products.

According to the invention, it is particularly advantageous that the oxidation effluent is contacted with a desoxygenation catalyst such as described in French Pat. No. 75-31 769 (Publication No. 2 327 960) before contacting the CLAUS catalyst. Such a desoxygenation catalyst can promote the CLAUS reaction between H₂S and SO₂ for the formation of sulphur and furthermore it ensures complete elimination of residual oxygen possibly present in the oxidation effluent.

When the CLAUS reaction is applied at a temperature lower than the dew point of sulphur contained in the oxidation effluent, the desoxygenation catalyst is contained in a desoxygenation reactor placed upstream of the series of catalytic converters of which some operate as a regenerator and others as CLAUS reactors.

When the CLAUS reaction is applied at a temperature higher than the dew point of the sulphur contained in the oxidation effluent, the desoxygenation catalyst can constitute only one attack layer or indeed the totality of the single catalytic converter or of the first converters of several catalytic converters mounted in series.

As in a standard sulphur plant, the gases issuing from the contacting of the oxidation effluent with the CLAUS catalyst are subjected to a thermal or catalytic incineration in order to transform into SO₂ all the sulphur compounds that they still contain in very small quantities, and the vapours resulting from the incineration are discarded into the atmosphere.

The following examples are given by way of non-limitative illustration of the invention.

EXAMPLE 1

Operation occurs in a pilot installation comprising the following elements:
an oxidation reactor with a fixed bed containing 600 kg of an oxidation catalyst according to the invention, the said reactor being equipped with a feed pipe for the mixture of acid gas and air and an evacuation pipe for the oxidation effluent;
an indirect gas/gas heat exchanger of which one of the exchange circuits is mounted in series on the feed pipe of the mixture of acid gas and air and the other exchange circuit is mounted in series with the evacuation pipe of the oxidation effluent;
a desoxygenation reactor having a fixed bed, that contains 1200 kg antioxygen catalyst in the form of beads of 4 to 6 mm diameter consisting of an activated alumina impregnated with iron sulphate (4% iron by weight of the calcinated catalyst) and of which the entry is connected to the evacuation pipe of the oxidation effluent through the appropriate exchange circuit of the heat exchanger;
a catalytic conversion battery comprising two catalytic converters and a sulpher condenser cooled by steam, in which, on the one hand, each of the said converters contains 1800 kg of CLAUS catalyst consisting of an activated alumina in the form of beads of 4 to 6 mm diameter and, on the other hand, the converters and the sulphur condenser are positioned in such a way that the exit of the desoxygenation reactor is alternatively associated to the entry of the other said converter(s), the latter being associated in series through the sulphur condenser; and
a thermal incinerator of which the entry is connected to the exit of the catalytic converter battery and the exit to the stack open to the atmosphere.

The oxidation catalyst is a catalyst prepared by impregnation of the beads, of 4 to 6 mm diameter, of a silica having a surface area of 240 m²/g by means of iron sulphate, the said catalyst containing 5% by weight of iron with respect to the calcinated catalyst weight.

The acid gas to be treated issued from the gasification of coal and had the following composition by volume:
H₂S .......... 1.5%
CO .......... 91.5%
H₂O .......... 7%

To this acid gas, which arrives at a flow-rate of 1000 m³/h (standard conditions), are added 35.7 m³/hour air, and the gaseous mixture obtained was preheated at a temperature of 250° C., through passage in the heat exchanger, then injected in the oxidation reactor. Contact time between the gaseous mixture and the oxidation catalyst were equal to 2 seconds (standard conditions) and the temperature within the catalytic bed rose to 315° C.

The effluent of the oxidation reactor contained H₂S and SO₂ in a H₂S/SO₂ molar ratio equal to 2/1, as well as 10 v.p.m. free oxygen and a quantity of sulphur vapour corresponding to a conversion rate of H₂S to sulphur of 40%.

This effluent, whose temperature was equal to 315° C., passed into the heat exchanger, where a part of the calories of the said effluent was used to pre-heat the acid gas and air mixture. The cooled effluent thereafter passes through the desoxygenation reactor, in which it was freed of residual oxygen contained therein. The contact time between the desoxygenation catalyst and the cooled effluent was equal to about 4 seconds.

The reaction medium containing H₂S, SO₂ and sulphur vapour, issued from the desoxygenation reactor was caused to flow through the converter in the "regeneration" phase of the catalytic converter battery in order to achieve a sweeping of the converter loaded with the sulphur contained in this converter, the said sweeping being carried out at a temperature of about 300° C. with a gas catalyst contact time of about 6 seconds. The gas loaded with sulphur issuing from the converter during regeneration, thus passes through the sulphur condenser cooled by steam, in which the said gas is cooled to a temperature of about 150° C. freed of sulphur contained therein by condensation. The resulting cooled gas, that contains $H_2S$ and $SO_2$ as well as a very small quantity of sulphur vapor was caused to flow into the catalytic converter in the "CLAUS reaction" phase of the catalytic conversion battery operating at a temperature of 150° C., with a gas catalyst contact time of about 6 seconds, in order to form sulphur by reaction between $H_2S$ and $SO_2$, the said sulphur being deposited on the catalyst.

The residual gases escaping from the converter in the CLAUS reaction phase, were caused to flow to the thermal incineration step and the fumes resulting from the incineration, that contained a small concentration of $SO_2$ as the unique sulphur compound, were discarded into the atmosphere through the stack.

The residual gases exiting from the catalytic conversion battery do not contain more than 936 v.p.m. total sulphur, namely $H_2S$ and $SO_2$, sulphur vapour and/or vesicular sulphur, that corresponds to a total conversion yield of $H_2S$ into sulphur of 93.5%.

EXAMPLE 2

Operation occurs in an installation similar to that used in Example 1, in which is treated an acid gas having the following composition by volume:
$H_2S$ ......... 1.5%
$CH_4$ ......... 0.14%
$CO$ ......... 0.33%
$H_2$ ......... 0.19%
$H_2O$ ......... 7.0%
$CO_2$ ......... 90.84%

The oxidation catalyst was obtained by impregnation of beads, 4 to 6 mm diameter, of a silica having a surface area of 250 m²/g by means of iron sulfate and palladium chloride, the said catalyst containing 4% by weight iron and 200 ppm palladium with respect by weight to the calcinated catalyst.

1000 m³/hour of acid gas was added to 61.4 m³/hour air and the mixture obtained was preheated to 250° C. prior to its injection in the oxidation reactor.

The other operating conditions correspond to those used in Example 1.

The effluent of the oxidation reactor contained $H_2S$ and $SO_2$ in a $H_2S/SO_2$ molar ratio equal to 2/1 as well as 8 v.p.m. free oxygen and a quantity of sulphur vapour corresponding to a conversion rate of $H_2S$ into sulphur equal to 38%; the said effluent, the temperature of which was 320° C., no longer contained CO or hydrogen.

Furthermore, the residual gases exiting from the catalytic conversion battery did not contain more than 940 v.p.m. total sulphur, that corresponds to an overall yield of conversion of $H_2S$ into sulphur equal to 93.4%.

EXAMPLE 3

Operation occurs in an installation similar to that used in Example 1 in which is treated an acid gas issuing from the gasification of coal and having the following composition by volume:
$H_2S$ .......... 12.0%
$CH_4$ .......... 0.14%
$CO$ .......... 0.33%
$H_2$ .......... 0.19%
$H_2O$ .......... 7.0%
$CO_2$ .......... 80.34%

The oxidation catalyst was the same as that used in Example 1, 1000 m³/hour acid gas was added to 311.4 m³/hours air and the mixture obtained was preheated at 200° C. prior to its injection in the oxidation reactor.

The other operating conditions correspond to those defined in Example 1.

The effluent of the oxidation reactor, the temperature of which was equal to 566° C., contained $H_2S$ and $SO_2$ in a $H_2S/SO_2$ molar ratio of 2/1 as well as 10 v.p.m. free oxygen and a quantity of sulphur vapour corresponding to a conversion rate of $H_2S$ into sulphur of 23%; the said effluent no longer contained CO or hydrogen.

Furthermore, the residual gases issuing from the catalytic converter battery did not contain more than 1200 v.p.m. total sulphur, that corresponds to an overall conversion yield into sulphur of $H_2S$ equal to 98.7%.

Even after a period of prolonged use of the oxidation catalyst at the high temperature used for the oxidation in this test, no significant aging of the said oxidation catalyst was observed.

In the three examples, the flow-rates of acid gas and air in M³/hour are defined in standard pressure and temperature conditions.

What is claimed is:

1. A catalytic process for the production of sulphur from an acid gas containing $H_2S$, which comprises: contacting said acid gas at a temperature from about 200° to 900° C. in the presence of an oxidation catalyst, with a controlled quantity of a gas containing free oxygen to form a gaseous effluent containing $H_2S$ and $SO_2$ in a $H_2S/SO_2$ molar ratio substantially equal to 2/1 and a proportion of sulphur; and cooling and contacting said effluent with a CLAUS catalyst to form a further quantity of sulphur, wherein the $H_2S$ oxidation catalyst consists essentially of a refractory porous matrix having a surface area of at least 5 m²/g comprising 50 to 100% by weight of at least one composition selected from the group consisting of silica, titanium oxide, expressed as $TiO_2$, zirconium oxide, expressed as $ZrO_2$ and zeolites and 0 to 50% by weight of alumina and containing about 0.5 to 15% by weight of the calcined catalyst, expressed as percent by weight of of metal, of at least one metal compound selected from the group consisting of Fe, Cu, Zn, Cd, Cr, Mo, W, Co, Ni, and Bi.

2. A process according to claim 1, wherein the catalysts contains at least one precious metal compound.

3. A process according to claim 1, wherein the porous matrix of the oxidation catalyst has a surface area ranging from 20 to 800 m²/g.

4. A process according to claim 3, wherein the oxidation catalyst has a surface area of from 50 to 600 m²/g.

5. A process according to claim 1 or 2, wherein the catalyst contains at least one metal compound selected from the group consisting of Fe, Cu, Zn, Cd, Cr, Mo, W, Co, Ni, and Bi and at least one precious metal compound selected from the group consisting of Pd, Pt, Ir and Rh, wherein the ratio of the total number of atoms of the at least one metal to the number of precious metal atoms being between 20 and 1000.

6. A process according to claim 5, wherein said ratio is between 50 and 400.

7. A process according to claim 1, wherein the oxidation catalyst comprises a porous matrix comprising at least one composition selected from the group consisting of silica, titanium oxide and zirconium oxide having a surface area of at least 5 m²/g, and a metal component selected from the group consisting of an iron compound, and an iron compound and a precious metal compound.

8. A process according to claim 7, wherein the surface area is between 20 and 800 m²/g.

9. A process according to claim 7, wherein the surface area is between 50 and 600 m²/g.

10. A process according to claim 1 or 2, wherein the overall quantity of the metal compound contained in the catalyst is between 4 and 12%, expressed as percent by weight of metal, of the weight of the calcined catalyst.

11. A process according to claim 7, wherein the quantity of iron or iron and precious metal contained in the oxidation catalyst is 0.5 to 12% by weight of the said calcined catalyst.

12. A process according to claim 11, wherein the quantity of iron or iron and precious metal contained in the oxidation catalyst is 4 to 12% by weight of the calcined catalyst.

13. A process according to claim 1, wherein the oxidation catalyst comprises silica having a specific surface area in the range of from 50 to 6000 M²/g said catalyst containing an iron compound, or an iron compound and a palladium compound, the quantity of iron or iron and palladium, expressed as percent by weight of metal, being 4 to 12% by weight of the calcined catalyst and, when palladium is present, the ratio of the number of iron atoms to the number of palladium atoms is between 20 and 1000.

14. A process according to claim 13, wherein the iron compound is iron sulfate.

15. A process according to claim 13 or 14, wherein the ratio of the number of iron atoms to the number of palladium atoms is between 50 and 400.

16. A process according to claim 1, wherein the acid gas contains 0.5 to 20% $H_2S$ by volume.

17. A process according to claim 16, wherein the acid gas contains up to 1% $H_2S$ by volume of at least one organic sulphur compound.

18. A process according to claim 16 or 17, wherein the organic sulphur compound is a mercaptan.

19. A process according to claim 1, wherein the oxidation of $H_2S$ in the acid gas is achieved at a temperature between 300° C. and 700° C.

20. A process according to claim 1 wherein the gaseous effluent has a $H_2S$ content below 2% by volume, and the contacting of the said effluent with the CLAUS catalyst is achieved at a temperature lower than the dew point of sulphur contained in the said effluent, the temperature being between 80° and 160° C. wherein the sulfur condenses and loads the CLAUS catalyst, and the CLAUS catalyst that is loaded with the sulphur is periodically regenerated by sweeping with a gas devoid of free oxygen at a temperature between 200° C. and 400° C.

21. A process according to claim 20, wherein the contacting with the CLAUS catalyst is achieved in a series of catalytic converters operating in such a way that at least one of the converters is in the regeneration phase when the others are in the CLAUS reaction phase, and the effluent from the oxidation zone passes, first, into the converter (s) in the regeneration phase, to remove the sulfur from the sulphur loaded catalyst contained therein, then, after separation of the sulphur, into the converters in the CLAUS reaction phase.

22. A process according to claim 1, wherein the oxidation effluent has an $H_2S$ content at least equal to 2% by volume and the contacting of said effluent with the CLAUS catalyst is carried out at temperatures higher than the dew point of sulphur contained in the effluent.

23. A process according to claim 22, wherein the temperature is between 200° C. and 450° C.

24. A process according to claim 22, wherein the contacting of the oxidation effluent with the CLAUS catalyst at temperatures higher than the dew-point of sulphur contained in the oxidation effluent forms a gas stream which is then contacted with a CLAUS catalyst at temperatures below the dew point of the sulphur in the gas stream.

25. A process according to claim 20, wherein the oxidation effluent is contacted with a deoxygenation catalyst before contacting the CLAUS catalyst.

26. A process according to claim 21 or 25, wherein the deoxygenation catalyst is contained in a reactor placed upstream from a series of catalytic converters, some of which operate as regenerators and the others as CLAUS reactors.

27. A process according to claim 23, 24 or 25, wherein the deoxygenation catalyst is a layer or the totality of a single catalytic converter operating above the dew-point of sulphur or of the first converters of several catalytic converters in series.

28. A process according to claim 1, wherein the gases issuing from the contacting of the oxidation effluent with the CLAUS catalyst are subjected to a thermal or catalytic incineration.

* * * * *